(12) United States Patent
Ghosh et al.

(10) Patent No.: US 10,574,084 B2
(45) Date of Patent: Feb. 25, 2020

(54) BI-DIRECTIONAL DC-DC CONVERTER

(71) Applicant: SCHNEIDER ELECTRIC IT CORPORATION, West Kingston, RI (US)

(72) Inventors: Rajesh Ghosh, Bangalore (IN); Mahendrakumar H. Lipare, Bangalore (IN); Damir Klikic, Waltham, MA (US); Mudiyula Srikanth, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 221 days.

(21) Appl. No.: 15/128,232

(22) PCT Filed: Mar. 27, 2014

(86) PCT No.: PCT/US2014/031994
§ 371 (c)(1),
(2) Date: Sep. 22, 2016

(87) PCT Pub. No.: WO2015/147828
PCT Pub. Date: Oct. 1, 2015

(65) Prior Publication Data
US 2017/0104365 A1 Apr. 13, 2017

(51) Int. Cl.
*H02J 9/00* (2006.01)
*H02J 9/06* (2006.01)
(Continued)

(52) U.S. Cl.
CPC ............... *H02J 9/061* (2013.01); *H02J 9/04* (2013.01); *H02M 1/4241* (2013.01);
(Continued)

(58) Field of Classification Search
CPC ..... H02J 9/00; H02J 9/04; H02J 9/061; Y10T 307/625; Y10T 307/615; H02M 3/33546; H02M 1/4241; H02M 3/33584
(Continued)

(56) References Cited

U.S. PATENT DOCUMENTS 5,978,236 A 11/1999 Faberman et al.
6,330,170 B1 12/2001 Wang et al.
(Continued)

FOREIGN PATENT DOCUMENTS

CN 1482726 A 3/2004
CN 201063530 Y 5/2008
(Continued)

OTHER PUBLICATIONS

Wei Chen et al. "Snubberless Bidirectional DC-DC converter with New CLLC Resonant Tank Featuring Minimized Switching Loss".*
(Continued)

*Primary Examiner* — Rexford N Barnie
*Assistant Examiner* — Rasem Mourad
(74) *Attorney, Agent, or Firm* — Lando & Anastasi, LLP

(57) ABSTRACT

According to at least one aspect, embodiments herein provide a UPS comprising an input to receive input power, an interface to receive DC battery power, a bi-directional converter coupled to the interface and configured to provide DC charging power, derived from the input power, to the battery in a first mode of operation and to convert the DC battery power into backup DC power in a second mode of operation, an output to provide output power to a load derived from at least one of the input power and the backup DC power, and a controller coupled to the bi-directional converter and configured to operate the bi-directional converter at a first frequency in the first mode of operation to generate the DC charging power and to operate the bi-
(Continued)

directional converter at a second frequency in the second mode of operation to generate the backup DC power.

20 Claims, 11 Drawing Sheets

(51) Int. Cl.
*H02M 1/42* (2007.01)
*H02J 9/04* (2006.01)
*H02M 3/335* (2006.01)

(52) U.S. Cl.
CPC ..... *H02M 3/33546* (2013.01); *Y10T 307/615* (2015.04); *Y10T 307/625* (2015.04)

(58) Field of Classification Search
USPC ...................................... 307/64–68
See application file for complete search history.

(56) References Cited

U.S. PATENT DOCUMENTS

| | | | |
|---|---|---|---|
| 6,879,132 | B2 | 4/2005 | Oki et al. |
| 9,634,512 | B1* | 4/2017 | Kim ..................... H02J 7/0031 |
| 2004/0207366 | A1 | 10/2004 | Sung |
| 2008/0238205 | A1* | 10/2008 | Lee ........................ H02J 9/061 |
| | | | 307/66 |
| 2011/0148205 | A1 | 6/2011 | Moon |
| 2011/0175451 | A1* | 7/2011 | Moon ..................... H02J 9/062 |
| | | | 307/66 |
| 2011/0208370 | A1 | 8/2011 | Lee |
| 2011/0215649 | A1 | 9/2011 | Min et al. |
| 2011/0317452 | A1* | 12/2011 | Anguelov ......... H02M 3/33584 |
| | | | 363/21.02 |
| 2012/0112547 | A1* | 5/2012 | Ghosh ..................... H02J 9/062 |
| | | | 307/66 |

FOREIGN PATENT DOCUMENTS

| | | |
|---|---|---|
| KR | 20110029798 A | 3/2011 |
| KR | 20130047800 A | 5/2013 |

OTHER PUBLICATIONS

Extended European Search Report from corresponding European Application No. 14887384.7 dated Oct. 5, 2017.

Jee-Hoon Jung et al: "Design Methodology of Bidirectional CLLC Resonant Converter for High-Frequency Isolation of DC Distribution Systems", IEEE Transactions on Power Electronics, vol. 28, No. 4, Apr. 1, 2013 (Apr. 1, 2013), pp. 1741-1755, XP055175724, ISSN: 0885-8993, DOI: 10.1109/TPEL.2012.2213346.

Wei Chen et al: "Snubberless Bidirectional DC-DC Converter With New CLLC Resonant Tank Featuring Minimized Switching Loss", IEEE Transactions on Industrial Electronics, IEEE Service Center, Piscataway, NJ, USA, vol. 57, No. 9, Sep. 1, 2010 (Sep. 1, 2010), pp. 3075-3086, XP011297961, ISSN: 0278-0046.

Notification of Transmittal of the International Search Report and the Written Opinion of the International Searching Authority from corresponding PCT/US2014/031994 dated Aug. 12, 2014.

* cited by examiner (a) Operation below the resonance, fn<1
500

(b) Operation at the resonance, fn=1
510

(c) Operation above the resonance, fn>1
520

BI-DIRECTIONAL DC-DC CONVERTER

CROSS-REFERENCE TO RELATED APPLICATIONS

This application is a U.S. National Stage Application under 35 U.S.C. § 371 of International Application No. PCT/US2014/031994, filed Mar. 27, 2014, titled BI-DIRECTIONAL DC-DC CONVERTER, which is hereby incorporated herein by reference in its entirety.

BACKGROUND OF INVENTION

1. Field of Invention

At least some embodiments described herein relate generally to the charging and/or discharging of a battery within an Uninterruptible Power Supply (UPS).

2. Discussion of Related Art

Uninterruptible power supplies ("UPS") are used in a variety of applications to provide power to electrical loads, for example, loads that are intended to operate during interruptions in a primary source of electrical power. In general, a UPS includes, or is connected to, both a primary source of power and an alternate source of power where the alternate source of power can be employed to supply power to the electrical load when the primary source is not available (i.e., in a backup mode of operation). Often, the primary source of power is an AC power source such as power supplied from an electric utility. The alternate source of power generally includes one or more batteries supplying DC power which is converted by the UPS into AC power and provided to the electrical load during the backup mode of operation.

SUMMARY OF INVENTION

At least one aspect of the invention is directed to an Uninterruptible Power Supply (UPS) comprising an input configured to be coupled to a power source and to receive input power, an interface configured to be coupled to a battery and to receive DC battery power, a bi-directional converter coupled to the interface and configured to provide DC charging power, derived from the input power, to the battery in a first mode of operation and to convert the DC battery power into backup DC power in a second mode of operation, an output configured to be coupled to a load and to provide output power to the load derived from at least one of the input power and the backup DC power, and a controller coupled to the bi-directional converter and configured to operate the bi-directional converter at a first frequency in the first mode of operation to generate the DC charging power and to operate the bi-directional converter at a second frequency in the second mode of operation to generate the backup DC power.

According to one embodiment, the UPS further comprises a converter coupled to the input and configured to convert the input power into DC power, a DC bus coupled to the converter and the bi-directional converter, and an inverter coupled to the DC bus and the output, wherein the bi-directional converter is configured, in the first mode of operation, to receive the DC power via the DC bus and convert the DC power into the DC charging power, and in the second mode of operation, to receive the DC battery power, convert the DC battery power into the backup DC power, and provide the backup DC power to the DC bus, and wherein the inverter is configured to provide the output power to the load derived from at least one of the DC power and the backup DC power. In one embodiment, a first gain applied by the bi-directional converter in the first mode of operation is a function of the first frequency set by the controller and a second gain applied by the bi-directional converter in the second mode of operation is a function of the second frequency set by the controller.

According to another embodiment, the bi-directional converter is a resonant converter comprising at least one battery interface configured to be coupled to the battery, a first converter bridge coupled to the at least one battery interface, a first resonant tank coupled to the first converter bridge, a first rectifier, a relay circuit configured to selectively couple the first resonant tank to the first rectifier in the second mode of operation, and at least one bus interface coupled between the first rectifier and the DC bus, wherein in the second mode of operation, the controller is configured to operate the first converter bridge at the first frequency to convert the DC battery power into first AC power, the first resonant tank is configured to apply the second gain to generate second AC power, and the first rectifier is configured to convert the second AC power into the backup DC power. In one embodiment, the first converter bridge is configured to implement soft-switching during at least one of turn-on and turn-off periods of the first converter bridge.

According to one embodiment, the bi-directional converter further comprises a second converter bridge coupled to the at least one bus interface, a second resonant tank selectively coupled to the second converter bridge via the relay circuit, and a second rectifier coupled to the second resonant tank, wherein in the first mode of operation, the controller is configured to operate the second converter bridge at the second frequency to convert the DC power from the DC bus into third AC power, the second resonant tank is configured to apply the first gain to generate fourth AC power, and the second rectifier is configured to convert the fourth AC power into the DC charging power. In one embodiment, the second converter bridge is configured to implement soft-switching during at least one of turn-on and turn-off periods of the second converter bridge.

According to another embodiment, the first resonant tank comprises a first inductor coupled to the first converter bridge, a first capacitor coupled to the first inductor, and a transformer having a first winding coupled to the first capacitor and a second winding selectively coupled to the first rectifier via the relay circuit. In one embodiment, the second resonant tank comprises a second inductor coupled to the second converter bridge, and a second capacitor coupled to the second inductor, wherein the transformer having the second winding is selectively coupled to the second capacitor via the relay switch, wherein the first capacitor is coupled to the first winding of the transformer, and wherein the first inductor is coupled between the second rectifier and the first capacitor.

Another aspect of the invention is directed to a method for operating a UPS, the UPS having an input, an interface configured to be coupled to a battery, and an output, the method comprising monitoring input power provided to the input from a power source, operating, in a first mode of operation, a bi-directional converter at a first frequency to provide DC charging power, derived from the input power, to the battery, operating, in a second mode of operation, the bi-directional converter at a second frequency to convert DC battery power from the battery into backup DC power, and providing output power to the load derived from at least one of the input power and the backup DC power.

According to one embodiment, the method further comprises converting the input power into DC power, and applying, in the first mode of operation with the bi-directional converter, a first gain to generate the DC charging power having a charging current level, the first gain being a function of the first frequency of the bi-directional converter. In one embodiment, the method further comprises applying, in the second mode of operation with the bi-directional converter, a second gain to generate the backup DC power having a backup DC voltage level, the second gain being a function of the second frequency of the bi-directional converter.

According to another embodiment, the method further comprises monitoring, in the first mode of operation, a voltage level across the battery, and in response to monitoring the voltage across the battery, adjusting the first frequency of the bi-directional converter to maintain the charging current level at a desired charging current reference level. In one embodiment, the method further comprises determining that the voltage level across the battery is less than a maximum voltage level, and in response to determining that the voltage level across the battery is less than the maximum voltage level, setting the first frequency of the bi-directional converter to maintain the charging current level at a maximum current reference level. In another embodiment, the method further comprises, in response to determining that the voltage level across the battery is at the maximum voltage level, setting the first frequency of the bi-directional converter to maintain the charging current level at zero.

According to one embodiment, the method further comprises monitoring, in the second mode of operation, a voltage level across the battery, and in response to monitoring the voltage across the battery, adjusting the second frequency of the bi-directional converter to maintain the backup DC voltage level at a reference voltage level.

According to another embodiment, operating the bi-directional converter in the first mode of operation at the first frequency includes implementing soft switching during at least one of turn-on and turn-off periods of the bi-directional converter. In one embodiment, operating the bi-directional converter in the second mode of operation at the second frequency includes implementing soft switching during at least one of turn-on and turn-off periods of the bi-directional converter.

At least one aspect of the invention is directed to an Uninterruptible Power Supply (UPS) comprising an input configured to be coupled to a power source and to receive input power, an interface configured to be coupled to a battery and to receive backup DC power, an output configured to be coupled to a load and to provide output power to the load derived from at least one of the input power and the backup DC power, and means for providing bi-directional DC-DC power conversion between the battery and the UPS.

According to one embodiment, the UPS further comprises means for implementing soft switching during at least one of turn on and turn off periods of the means for providing bi-directional power conversion.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
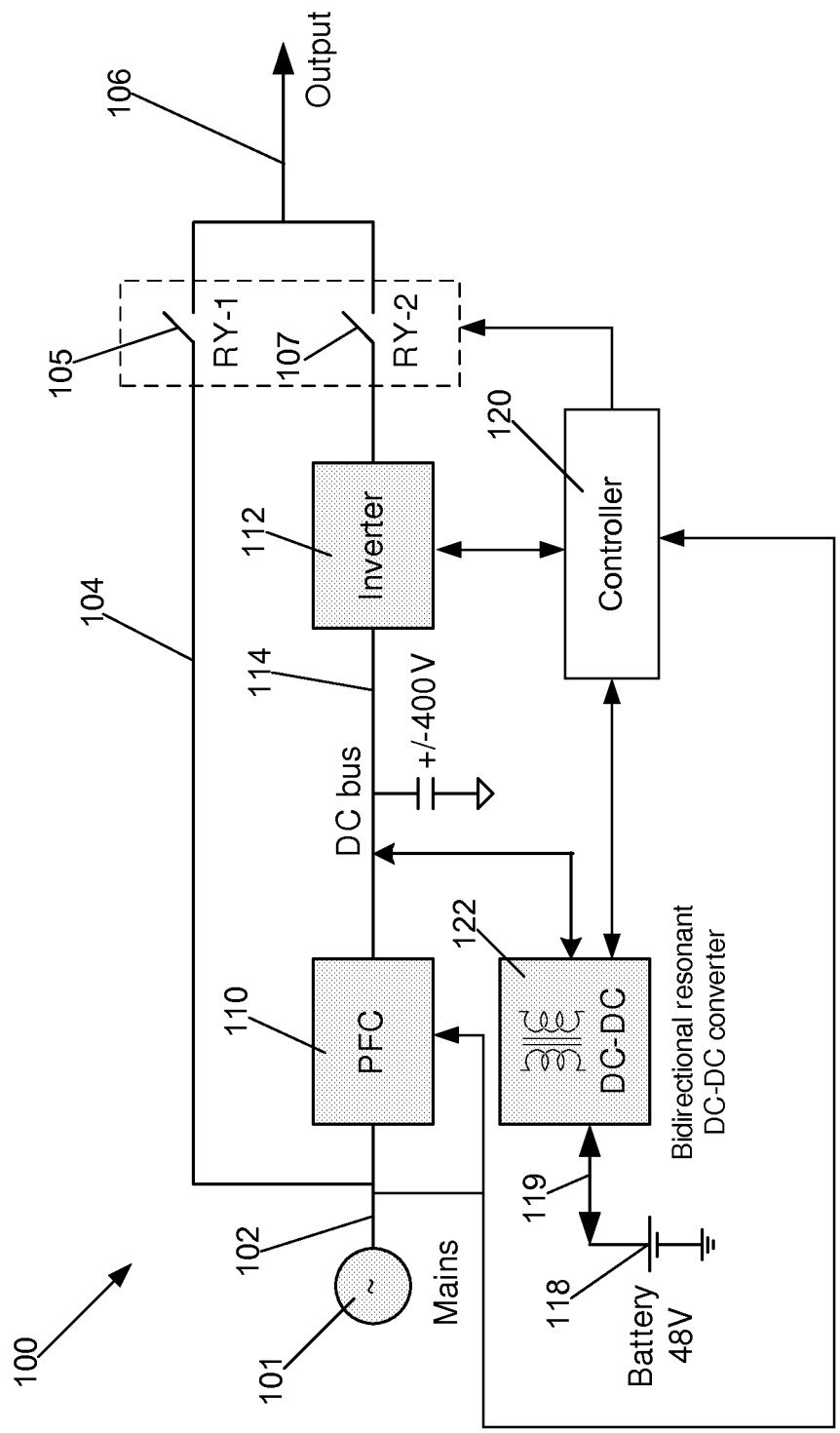
FIG. 1 is a block diagram of an online UPS according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, the alternative source of power within a typical UPS is a battery. A common online UPS employs two unidirectional and isolated DC-DC converters to interface its battery with an internal high-voltage DC bus coupled between an AC/DC converter and a DC/AC inverter. The first DC-DC converter (e.g., the discharger) feeds the DC bus from the battery in a battery mode of operation, and the second DC-DC converter (e.g., the charger) charges the battery from the DC bus.

In some online UPS applications, the charger is designed with a low power rating as it is intended to support only the charging of the internal battery of the UPS. In other applications (e.g., where high capacity external batteries are used or a quick battery charging time is desired), a high-power charger may be utilized. In such a situation, the power rating of the high-power charger may be comparable to the power rating of the high-power discharger. However, the use of two high-power converters (e.g., a charger and a discharger), of relatively equal capacity, within a UPS system may result in poor converter utilization (e.g., only one converter is used at a given time), low power density, increased size of the UPS, increased weight of the UPS, and/or increased cost of the UPS. Accordingly, a bi-directional resonant DC-DC converter is described herein that addresses the above issues related to the use of dual high-power converters.

FIG. 1 is a block diagram of an online UPS 100 including a bi-directional resonant DC-DC converter 122 according to at least one embodiment of the current invention. The UPS 100 also includes an input 102, an output 106, an output relay 107, a bypass line 104, a bypass relay 105, an AC/DC converter 110, a DC bus 114, a DC/AC inverter 112, a battery 118, and a controller 120.

The input 102 is configured to be coupled to an AC power source 101 such as a utility power source and to the AC/DC converter 110. The input 102 is also selectively coupled to the output 106 via the bypass line 104 and the bypass relay 105. The AC/DC converter 110 is also coupled to the DC/AC inverter 112 via the DC bus 114. The DC/AC inverter 112 is also selectively coupled to the output 106 via the output relay 107. The battery 118 is coupled to the DC bus 114 via an interface 119 and the bi-directional resonant DC-DC converter 122. The controller 120 is coupled to the input 102, the bypass relay 105, the output relay 107, the bi-directional resonant DC-DC converter 122, the AC/DC converter 110, and the DC/AC inverter 112.

Based on the quality of the AC power received from the utility source 101, the UPS 100 is configured to operate in different modes of operation. For example, according to one embodiment, the controller 120 monitors the AC power received from the utility source 101 at the input 102 and, based on the monitored AC power, sends control signals to the bypass relay 105, the output relay 107, the bi-directional resonant DC-DC converter 122, the AC/DC converter 110, and the DC/AC inverter 112 to control operation of the UPS 100.

In response to a determination that the AC power received from the utility source 101 is acceptable (e.g., at a desired level), the controller 120 operates the UPS 100 to enter a "bypass" mode of operation. In the "bypass" mode of operation, the controller 120 transmits control signals to operate the bypass relay 105 to couple the output 106 to the bypass line 104. Accordingly, in the "bypass" mode of operation, the input 102 of the UPS 100 (coupled to the utility source 101) is coupled directly to the output 106 of the UPS 100 via the bypass line 104 and unconditioned AC power received at the input 102 from the utility source 101 is provided directly to the output 106 to power a load.

In response to a determination that the AC power received from the utility source is in a sag or swell condition (e.g., above or below a desired level), the controller 120 operates the UPS 100 to enter an "online" mode of operation. In the "online" mode of operation, the controller 120 transmits control signals to operate the output relay 107 to selectively couple the output 106 to the DC/AC inverter 112, and the AC/DC converter 110 receives AC power from the utility source 101 coupled to the input 102. The controller 120 operates the AC/DC converter 110 to convert the AC power into DC power and provide the DC power to the DC bus 114. The inverter DC/AC inverter 112 is operated by the controller 120 to convert the DC power on the DC bus 114 into conditioned AC power and the conditioned AC power is provided to the output 106. Also in the "online" mode of operation, the controller 120 operates the bi-directional resonant DC-DC converter 122 to charge the battery 118 with DC power from the DC bus 114.

In response to a determination that the AC power received from the utility source is in a brownout or blackout condition, the controller 120 operates the UPS 100 to enter a "battery" mode of operation. In the "battery" mode of operation, the controller 120 transmits control signals to operate the output relay 107 to couple the output 106 to the DC/AC inverter 112, and DC power from the battery 118 is provided to the bi-directional resonant DC-DC converter 122 as the battery 118 discharges. The bi-directional resonant DC-DC converter 122 converts the received DC power from the battery 118 into DC power at a desired level and provides the converted DC power to the DC bus 114. The DC/AC inverter 112 is operated by the controller 120 to convert the DC power received from the battery 118, via the bi-directional resonant DC-DC converter 122 and the DC bus 114, into conditioned AC power and the conditioned AC power is provided to the output 106.

The bi-directional resonant DC-DC converter 122 is configured to operate as a high-power discharger (e.g., in the "battery" mode of operation discussed above) and a high-power charger (e.g., in the "online" mode of operation discussed above). According to some embodiments, by utilizing a single bi-directional resonant DC-DC converter 122 as a discharger and a charger (rather than dual high-power converters as discussed above), the UPS 100 may realize high converter utilization, high power density, and a total reduced cost. Also, according to at least one embodiment, the bi-directional resonant DC-DC converter 122 is configured to utilize soft switching during turn on and turn off periods of the converter 122. Soft switching allows the converter 122 to operate at a high switching frequency, thereby reducing the size of the magnetic components of the converter 122. This also helps in achieving high power density in the UPS 100 and a lower total cost of the UPS 100. Soft switching also results in low switching loss and a higher efficiency in the converter 122.

Figure 2:
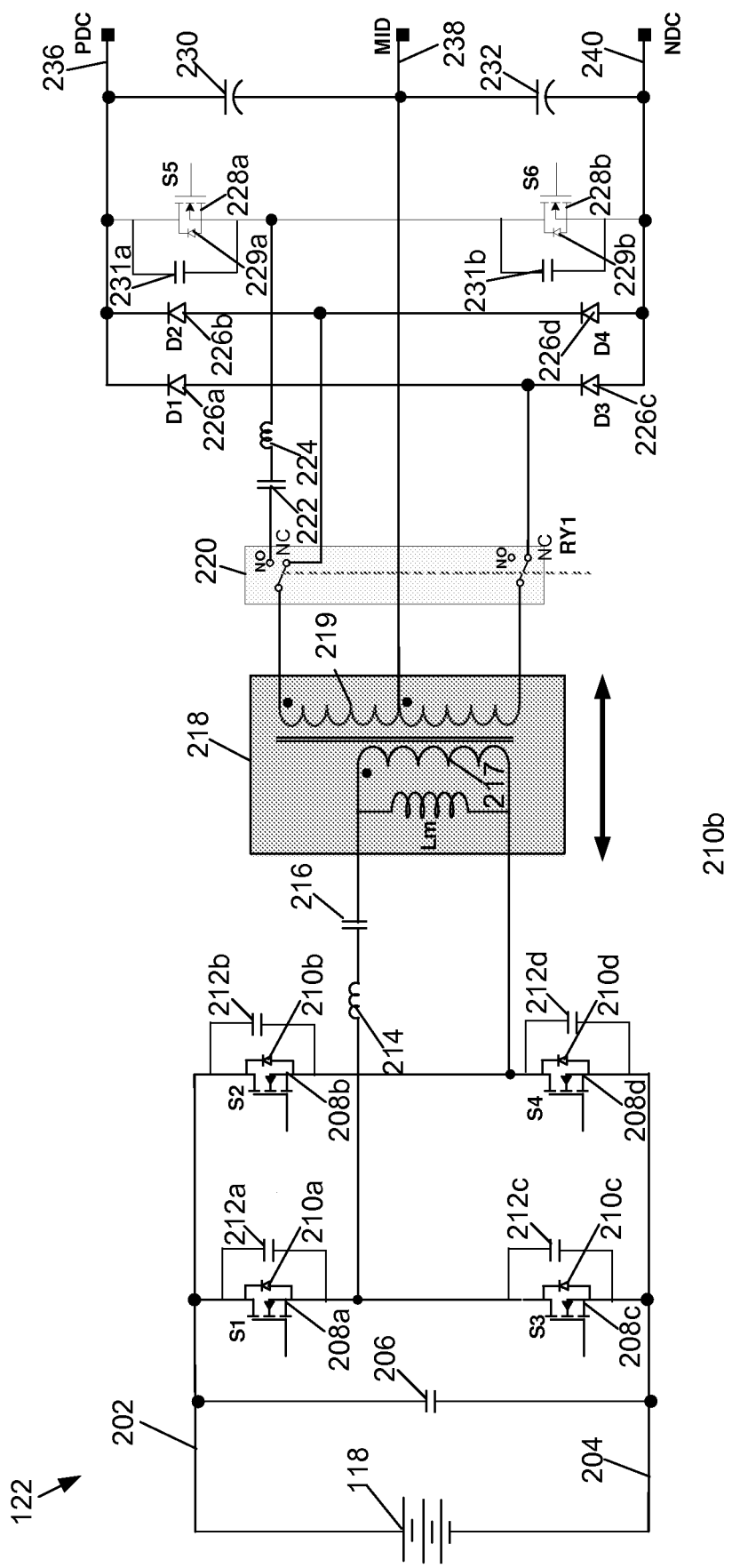
FIG. 2 is a circuit diagram of a bi-directional resonant DC-DC converter according to aspects of the current invention.

FIG. 2 is a circuit diagram of the bi-directional resonant DC-DC converter 122. The converter 122 includes a positive battery interface 202, a negative battery interface 204, a first capacitor 206, a first converter bridge (e.g., including a first group of switches (S1-S4) 208a-208d), a first inductor 214, a second capacitor 216, a transformer 218, a relay circuit 220, a third capacitor 222, a second inductor 224, a plurality of diodes (D1-D4) 226a-226d, a second converter bridge (e.g., including a second group of switches (S5-S6) 228a-228b), a fourth capacitor 230, a fifth capacitor 232, a positive bus interface 236, a neutral bus interface 238, and a negative bus interface 240.

The positive battery interface 202 of the converter 122 is coupled to a positive terminal of the battery 118 and the negative battery interface 204 of the converter is coupled to a negative terminal of the battery 118. The first capacitor 206 is coupled between the positive battery interface 202 and the negative battery interface 204. The positive battery interface 202 is also coupled to the drains of switches S1 208a and S2 208b. The negative battery interface 204 is also coupled to the sources of switches S3 208c and S4 208d. The source of switch S1 208a is coupled to a first terminal of the first inductor 214. A second terminal of the first inductor 214 is coupled to a first terminal of a first winding 217 of the transformer 218 via the second capacitor 216. The drain of switch S4 208d is coupled to a second terminal of the first winding 217 of the transformer 218.

A first terminal of a second winding 219 of the transformer 218 is selectively coupled, via the relay circuit 220, to either a first terminal of the second inductor 224 via the third capacitor 222 or the anode of diode D2 226b. A second terminal of the second inductor 224 is coupled to the source of switch S5 228a. The cathodes of diodes D1 226a and D2 226b are coupled to the positive bus interface 236. The drain of switch S5 228a is also coupled to the positive bus interface 236. A second terminal of the second winding 219 of the transformer 218 is coupled to the neutral bus interface 238. A third terminal of the second winding 219 of the transformer 218 is selectively, via the relay circuit 220, either coupled to the cathode of diode D3 226c or left floating.

The anodes of diodes D3 226c and D4 226d are coupled to the negative bus interface 240. The source of switch S6 228b is also coupled to the negative bus interface 240. The cathode of diode D3 226c is also coupled to the anode of diode D1 226a. The cathode of diode D4 226d is also coupled to the anode of diode D2 226b. The drain of switch S6 228b is also coupled to the source of switch S5 228a. The fourth capacitor 230 is coupled between the positive bus interface 236 and the neutral bus interface 238. The fifth capacitor 232 is coupled between the neutral bus interface 238 and the negative bus interface 240.

According to one embodiment the switches 208a-208d in the first group of switches are Metal-Oxide-Semiconductor Field-Effect Transistors (MOSFET); however, in other embodiments, other appropriate types of switches may be utilized. Each switch 208a-208d within the first group of switches includes a body diode 210a-210d coupled across its drain and source. Each switch 208a-208d also includes a capacitor 212a-212d coupled across its drain and source. According to one embodiment, the switches 228a-228b in the second group of switches are MOSFETs; however, in other embodiments, other appropriate types of switches may be utilized. Each switch 228a-228b within the second group of switches includes a body diode 229a-229b coupled across its drain and source. Each switch 228a-228b also includes a capacitor 231a-231b coupled across its drain and source.

According to one embodiment, the gate of each switch 208a-208d in the first group of switches is coupled to the controller 120. However, in other embodiments, the gate of each switch 208a-208d in the first group of switches may be coupled to another controller. According to one embodiment, the gate of each switch 228a-228b in the second group of switches is coupled to the controller 120. However, in other embodiments, the gate of each switch 228a-228b in the second group of switches may be coupled to another controller.

The bi-directional resonant DC-DC converter 122, shown in FIG. 2, is a combination of two resonant DC-DC converters realized into a single converter 122. The relay circuit 220 is utilized to combine the two resonant topologies and select a mode of operation of the converter 122. In a first mode of operation (e.g., a discharger mode of operation), the relay circuit is in its NC position. In a second mode of operation (e.g., a charger mode of operation), the relay circuit is in its NO position.

In each mode of operation, the converter 122 operates as a frequency selective resonant tank circuit. The resonant tank circuit regulates the output voltage of the converter 122 (to either the DC buses 236, 240 or the battery 118) through its frequency control. The resonant tank circuit also allows turn-on soft switching for the converter switches currently in operation (e.g., either the first group of switches (S1-S4) 208a-208d or the second group of switches (S5-S6) 228a-228b depending on the selected mode of operation) and may help reduce switching losses. According to one embodiment, turn-off soft switching for the selected switching devices may be obtained using the capacitors 212a-212d across the first group of switches (S1-S4) 212a-212d in the discharger mode and the capacitors 231a-231b across the second group of switches (S5-S6) 228a-228b in the charger mode.

According to one embodiment, a primary side of the transformer 218 is energized through the resonant tank circuit by operating selected switching devices (e.g., the first group of switches (S1-S4) 208a-208d in the discharger mode of operation and the second group of switches (S5-S6) in the charger mode of operation) through 50% duty Pulse Width Modulation (PWM) under control of the controller 120. In other embodiments, the selected switching devices may be controlled through PWM having a different duty cycle. The output voltage of the converter 122 (e.g., output to the DC buses 236, 240 or the battery 118) is obtained by rectifying a resulting voltage on a secondary side of the transformer through diodes (e.g., diodes D1-D4 226a-226d in the discharger mode of operation, and the body diodes 210a-210d of the switches S1-S4 in the charger mode of operation). The operation of the converter 122 in the discharger and charger modes of operation is discussed in greater detail below with regard to FIGS. 2-7.

Figure 3:
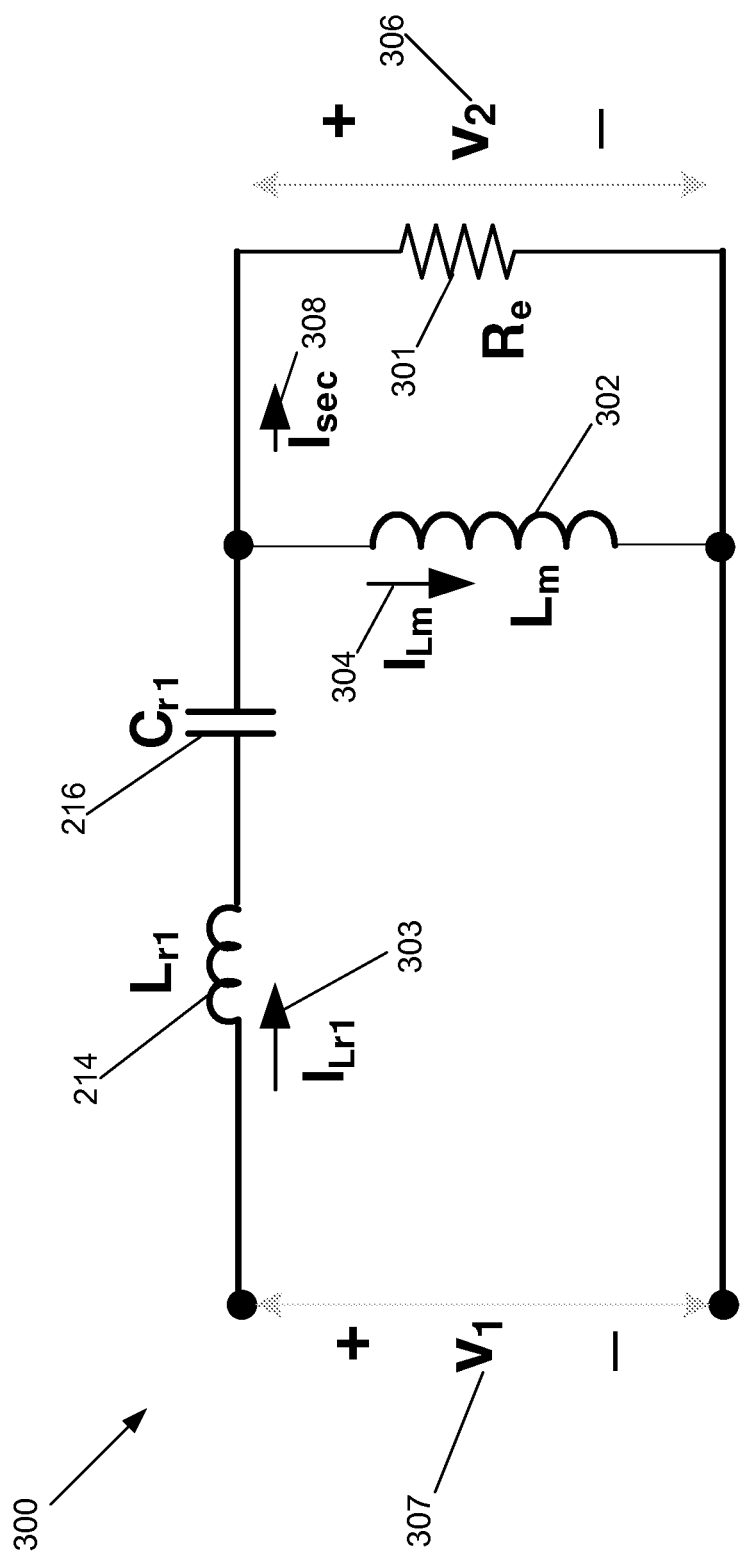
FIG. 3 is a circuit diagram of an equivalent resonant tank circuit of a bi-directional resonant DC-DC converter in a discharger mode of operation according to aspects of the current invention.

FIG. 3 is a circuit diagram of an equivalent resonant tank circuit 300 of the converter 122 when the converter 122 is in the discharger mode of operation (i.e., the relay circuit 220 is in the NC position) and the windings 217, 219 of the transformer 218 have a 1:1 turns ratio. The load resistance ($R_e$) 301 represents an AC equivalent load resistor seen by the secondary side of the transformer 218 (i.e., coupled to the second winding 219 of the transformer 218). The magnetizing inductance ($L_m$) 302 is the inductance seen across the transformer 218.

In one embodiment, the magnetizing inductance ($L_m$) 302 is realized by introducing an air gap in the core of the transformer 218 (i.e., between the first winding 217 and the second winding 219); however, in other embodiments, the magnetizing inductance ($L_m$) 302 may be an inductor coupled across the first winding 217. According to one embodiment, the value of the magnetizing inductance ($L_m$) 302 is selected to generate magnetizing current ($I_{LM}$) 304 around twenty-five percent of the rated load current of the converter 122; however, in other embodiments, the magnetizing inductance ($L_m$) 302 may be configured differently. The first inductor 214 and the second capacitor 216 are series resonant elements.

Figure 10:
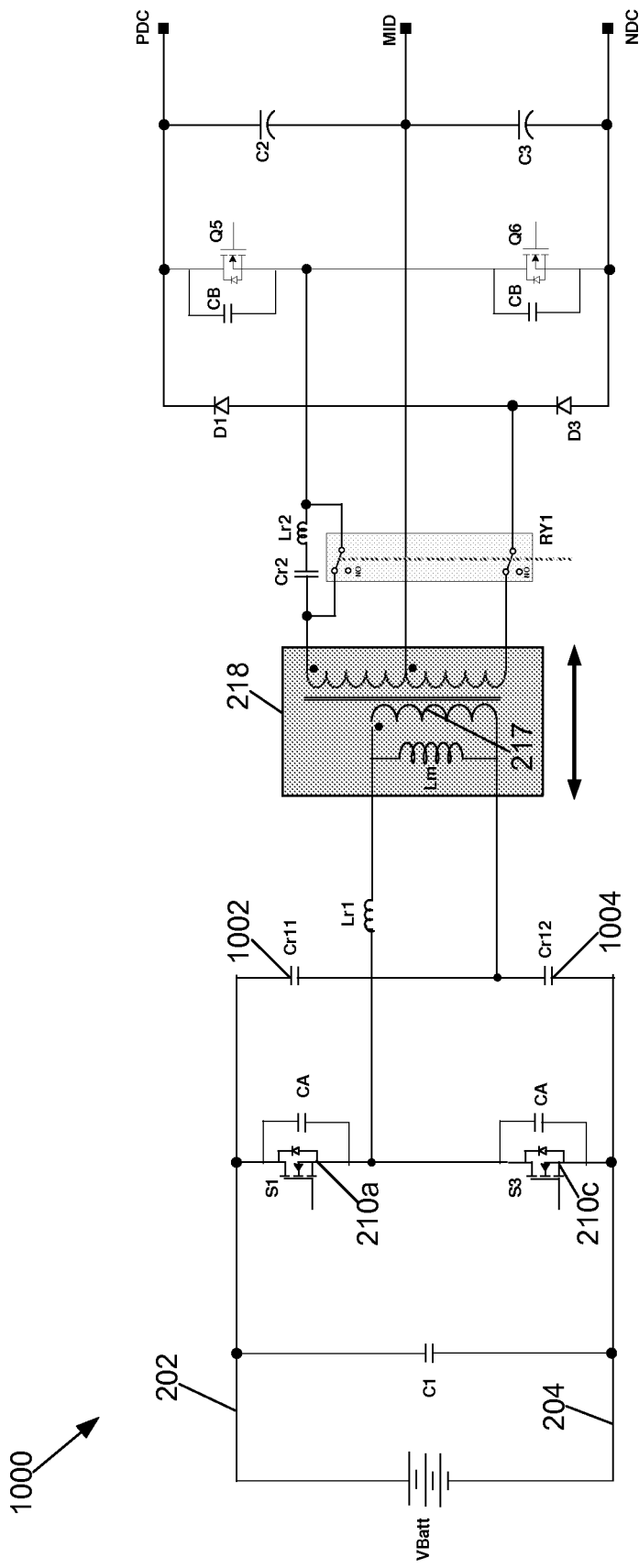
FIG. 10 is a circuit diagram of another embodiment of a bi-directional resonant DC-DC converter according to aspects of the current invention.

According to one embodiment (e.g., as shown in the converter 1000 of FIG. 10), the second capacitor 216 may be replaced by a first replacement capacitor 1002 coupled between the positive battery interface 202 and the second terminal of the first winding 217 of the transformer 218 and a second replacement capacitor 1004 coupled between the negative battery interface 204 and the second terminal of the first winding 217 of the transformer 218. In other embodiments, the second capacitor 216 may be configured differently.

In the discharger mode of operation, the converter 122 receives DC power from the battery 118. The first group of switches (S1-S4) 208a-208d is operated, by the controller 120, to convert the DC power received from the battery 118 into AC power having a desired voltage V 307 and current ($I_{Lr1}$) 303. The AC power from the first group of switches (S1-S4) 208a-208d energizes the first winding 217 of the transformer 218 and as a result, a secondary current ($I_{sec}$) 308 is generated in the second winding 219. The secondary current ($I_{sec}$) 308 generates a voltage ($V_2$) 306 across the load resistance ($R_e$) 301 (i.e., across the second winding 219 of the transformer 218). The voltage ($V_2$) 306 is rectified by the diodes D1-D4 226a-226d and resulting rectified DC power is provided to the positive bus interface 236 and the negative bus interface 240.

Figure 9:
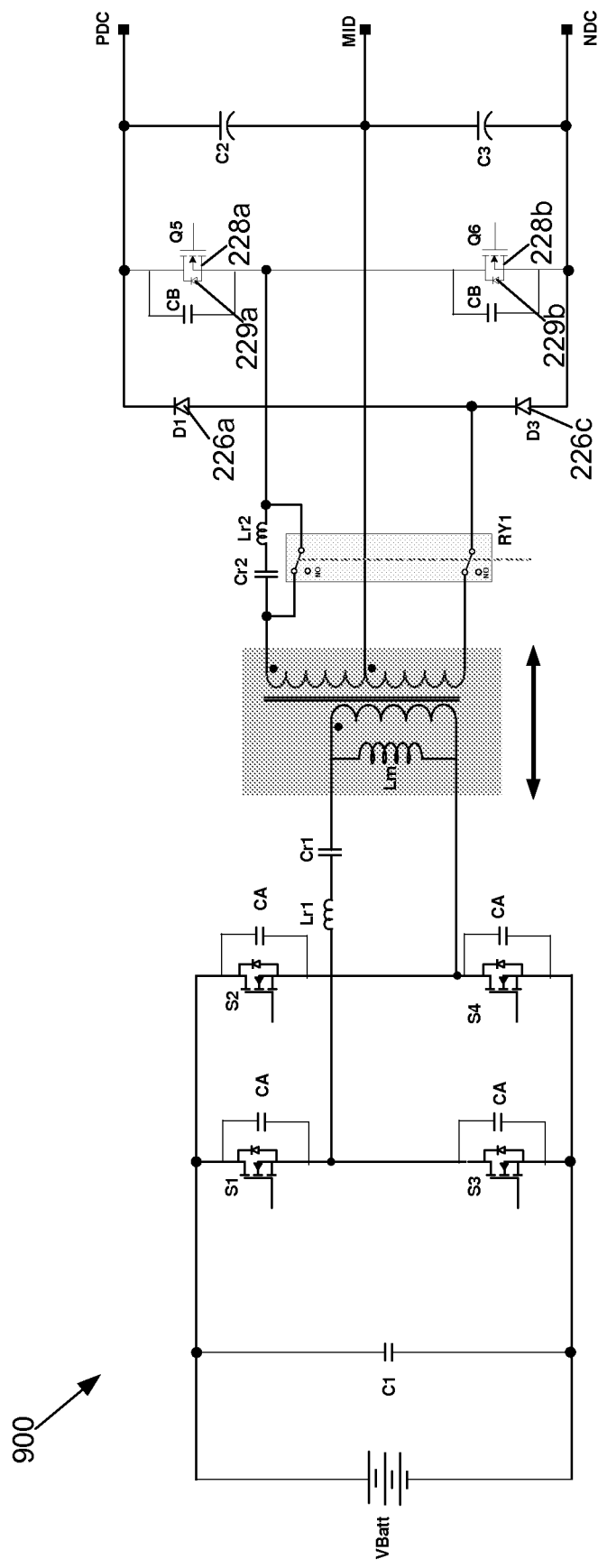
FIG. 9 is a circuit diagram of another embodiment of a bi-directional resonant DC-DC converter according to aspects of the current invention.

According to one embodiment (e.g., as shown in the converter 900 of FIG. 9), diodes D2 226b and D4 226d are replaced by the body diodes 229a-229b of the second group of switches (S5-S6) 228a-228d and the voltage ($V_2$) 306 is rectified by the diode D1 226a, the diode D3 226c, the body diode 229a of switch S5 228a, and the body diode 229b of switch S6 228b.

Figure 4:
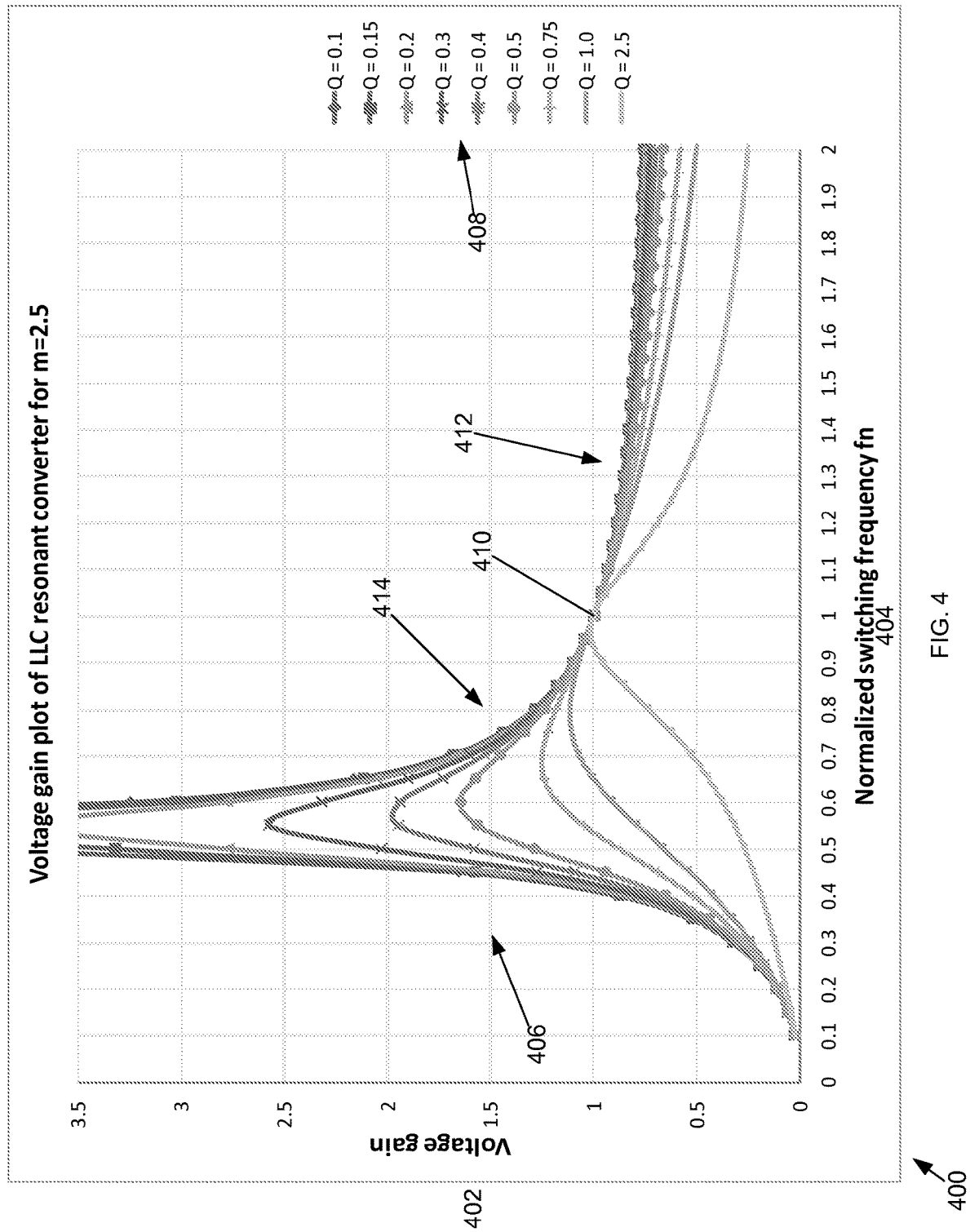
FIG. 4 is a graph illustrating voltage gain versus normalized switching frequency of a bi-directional resonant DC-DC converter in a discharger mode of operation according to aspects of the current invention.

The voltage gain ($V_2$ 306/$V_1$ 307) of the resonant tank 300 shown in FIG. 3 is a function of the operating frequency of the converter 122 (i.e., of the switching frequency of the first group of switches (S1-S4) 208a-208d determined by the controller 120. FIG. 4 is a graph 400 illustrating voltage gain ($V_2/V_1$) 402 versus normalized switching frequency ($f_n$) 404 of the converter 122. The normalized switching frequency ($f_n$) 404 is the switching frequency of the converter 122 divided by the series resonant frequency ($f_{o1}$) of the first inductor 214 and the second capacitor 216. The graph 400 shows different voltage gain curves 406 of the resonant tank 300 at different quality factors (Q) 408 and with the variable m being 2.5, wherein m is equal to the magnetizing inductance ($L_m$) 302 divided by the inductance of the first inductor 214.

The controller 120 monitors the output voltage of the battery 118 and, based on the output voltage of the battery, adjusts the switching frequency of the converter 122 to maintain the output voltage ($V_2$) of the resonant tank at a desired reference voltage. For example, if the controller 120 determines that the output voltage of the battery 118 is at a nominal level, the controller 120 operates the first group of switches (S1-S4) 208a-208d to operate at the resonant frequency (i.e., $f_n=1$) 410. At the resonant frequency 410, the resonant tank 300 has unity voltage gain (for 1:1 transformer turns ratio) and the output voltage ($V_2$) 306 of the resonant tank is maintained around the desired reference level (i.e., $V_2=V_1$).

If the controller 120 determines that the output voltage of the battery 118 is higher than the nominal level, the controller 120 increases the switching frequency of the converter 122 to a level above the resonant frequency (i.e., $f_n>1$) 412. At the level 412 above the resonant frequency 410, the resonant tank has a voltage gain less than unity (for 1:1 transformer turns ratio) and the output voltage ($V_2$) 306 of the resonant tank is maintained at the reference level despite the higher than nominal battery output voltage (i.e., $V_2<V_1$). If the controller 120 determines that the output voltage of the battery 118 is lower than the nominal level, the controller 120 decreases the switching frequency of the converter 122 to a level 414 below the resonant frequency 410 (i.e., $f_n<1$). At the level below the resonant frequency 414, the resonant tank has a voltage gain greater than unity (for 1:1 transformer turns ratio) and the output voltage ($V_2$) 306 of the resonant tank is maintained at the reference level despite the lower than nominal battery output voltage (i.e., $V_2>V_1$).

The bidirectional DC-DC resonant converter 122 incurs minimum losses, and offers maximum efficiency, when it is operated at the series resonant frequency (i.e., $f_n=1$). The efficiency may begin to degrade as the switching frequency is changed on either side of the resonant frequency. Therefore, according to one embodiment, the switching frequency is kept at the resonant frequency for a longer duration even if the output voltages 306, or the voltages across the capacitors 230 and 232, decrease below nominal levels. The output voltage across the capacitors 230 and 232 is allowed to fall from its rated value (e.g., 400V) to a minimum acceptable value (e.g., 380V). Once the output voltage of the battery 118 reaches its minimum acceptable level, it is regulated around the minimum acceptable level value by decreasing the switching frequency (as discussed above). Hence, the converter 122 is operated at its optimum efficiency level between the rated output voltage and the minimum acceptable output voltage of the battery 118.

As discussed above, the converter 122 may also be configured to allow soft switching during turn-on of switches (S1-S4) 208a-208d. Due to resonance action in the converter 122, the current in the resonant tank 300 is sinusoidal in nature. Depending on the switching frequency of the converter 122 (e.g., as set by the controller 120), the converter 122 may operate in one of three different zones; operation above the resonance, $f_n>1$, operation at the resonance $f_n=1$, and operation below the resonance $f_n<1$. Corresponding currents through different branches of the resonant tank 300 during different zones of operation, with respect to time (t) 502, are shown in FIG. 5, where $V_1$ 307 is the voltage generated by the first group of switches (S1-S4) 208a-208d and provided to the resonant tank 300 as discussed above.

Waveform (a) 500 illustrates current through different branches of the resonant tank 300 while the converter 122 is operating below the resonance frequency (i.e., $f_n<1$). Waveform (b) 510 illustrates current through different branches of the resonant tank 300 while the converter 122 is operating at the resonance frequency (i.e., $f_n=1$). Waveform (c) 520 illustrates current through different branches of the resonant tank 300 while the converter 122 is operating above the resonance frequency (i.e., $f_n>1$). The input current ($I_{Lr1}$) 303 to the resonant tank 300 is the output current of the first group of switches (S1-S4) 208a-208d, generated from the DC power provided by the battery 118. The secondary current ($I_{sec}$) 308 through the second winding 219 of the transformer 218 is sinusoidal in nature and is governed by the resonant frequency $f_{o1}$, as discussed above.

Figure 5:
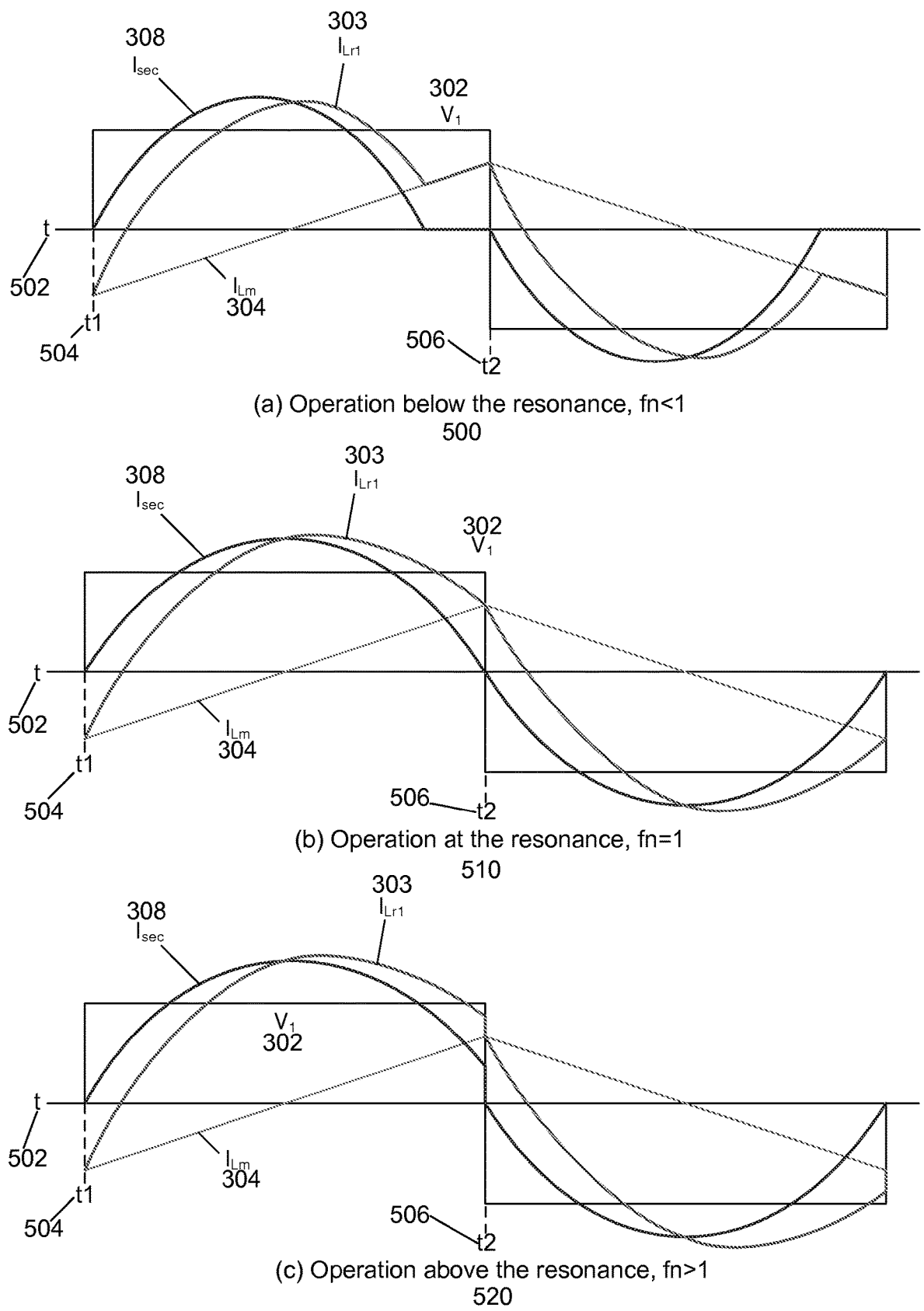
FIG. 5 includes graphs illustrating current through different branches of a resonant tank of a bi-directional resonant DC-DC converter during different zones of operation according to aspects of the current invention.

As shown in FIG. 5, independent of the zone of operation of the converter 122 (i.e., above, below or at resonance), at time t1 504 (i.e., when $V_1$ 307 goes high (e.g., when the switches S1 208a and S4 208d are turned on)) the secondary current ($I_{sec}$) 308 is zero. Also independent of the zone of operation of the converter 122, at time t1 504, the magnetizing current ($I_{Lm}$) 304 in the transformer 218, being reactive in nature, is at its negative peak. Accordingly, at time t1 504 (i.e., when $V_1$ 307 goes high (e.g., when the switches S1 208a and S4 208d are turned on), the input current ($I_{Lr1}$) 303 (i.e., the sum of the secondary current ($I_{sec}$) 308 and the magnetizing current ($I_{Lm}$) 304) is negative regardless of the current zone of operation of the converter 122. The negative input current ($I_{Lr1}$) 303 flows through the body diodes 210a, 210d of the switches S1 208a and S4 208d just before they are turned on. Accordingly, the switches S1 208a and S4 208d turn on with zero voltage switching (ZVS) (i.e., soft switching) and incur low turn-on switching loss. In addition, as the secondary current ($I_{sec}$) 308 is zero at the instant of device turn on (i.e., at time t1 504), there is no reverse recovery loss for the diodes D1-D4 226a-226d.

As also discussed above, the converter 122 may be configured to allow soft switching during turn-off of switches (S1-S4) 208a-208d. For example, as shown in FIG. 5, when the converter 122 is operating either at or below resonance (e.g., waveforms (a) 500 and (b) 510), at time t2 506 (i.e., when the voltage $V_1$ 307 goes low (e.g., when the switches S1 208a and S4 208d are turned off), the secondary current ($I_{sec}$) 308 drops to zero before or at time t2 506 and the input current ($I_j$) 303 equals the magnetizing current ($I_{Lm}$) which is at a positive peak. When the converter 122 is operating above resonance (e.g., waveform (c) 520), at time t2 506, the secondary current ($I_{sec}$) 308 is greater than zero, the magnetizing current ($I_{Lm}$) is at a positive peak, and the input current ($I_{Lr1}$) 303 is the sum of the secondary current ($I_{sec}$) 308 and the magnetizing current ($I_{Lm}$) 304).

Absent mitigation, a non-zero input current ($I_{Lr1}$) 303 at time t2 506 (i.e., at turn off) may result in switches S1 208a and S4 208d exhibiting switching losses. Therefore, according to at least one embodiment, the capacitor 212a-212d coupled across the drain and source of each switch 208a-208d is a snubber graded capacitor configured to provide soft switching at turn off. For example, without the use of a snubber graded capacitor 212a-212d, just after being turned off, the voltage across a switch in the converter 122 (e.g., S1 208a) would rise steeply up to the battery 118 output voltage. The current through the switch (e.g., input current ($I_{Lr1}$) 303) would then decrease to zero and the switch 212a would experience switching loss at the output voltage of the battery 118. Through the user of the snubber graded capacitor's 212a-212d, such switching losses may be reduced.

If a snubber graded capacitor 212a is coupled across the drain and source of a switch in the converter 122 (e.g., S1 208a as seen in FIG. 2), just before the switch S1 208a is turned off, the capacitor 212a is charged up to the output voltage level of the battery 118. Once the switch S1 208a is turned off, the voltage across the switch S1 208a increases; however, due to the capacitor 212a, the voltage across the switch S1 208a increases at a slower rate than it would if the capacitor 212a was removed. The capacitance of the capacitor 212a is selected such that the rise time for the voltage across the switch S1 208a is higher than the device turn-off switching time. As a result, the switch S1 208a turns off at a voltage less than the output voltage level of the battery, resulting in reduced turn-off switching losses in the switch S1 208a. The turn-on and turn-off soft switching of the converter 122 in the discharger mode of operation is described above with regard to switches S1 208a and S4 208d; however, similar turn-on and turn-off soft switching may be implemented in the discharger mode of operation with switches S2 208b and S3 208c.

Figure 6:
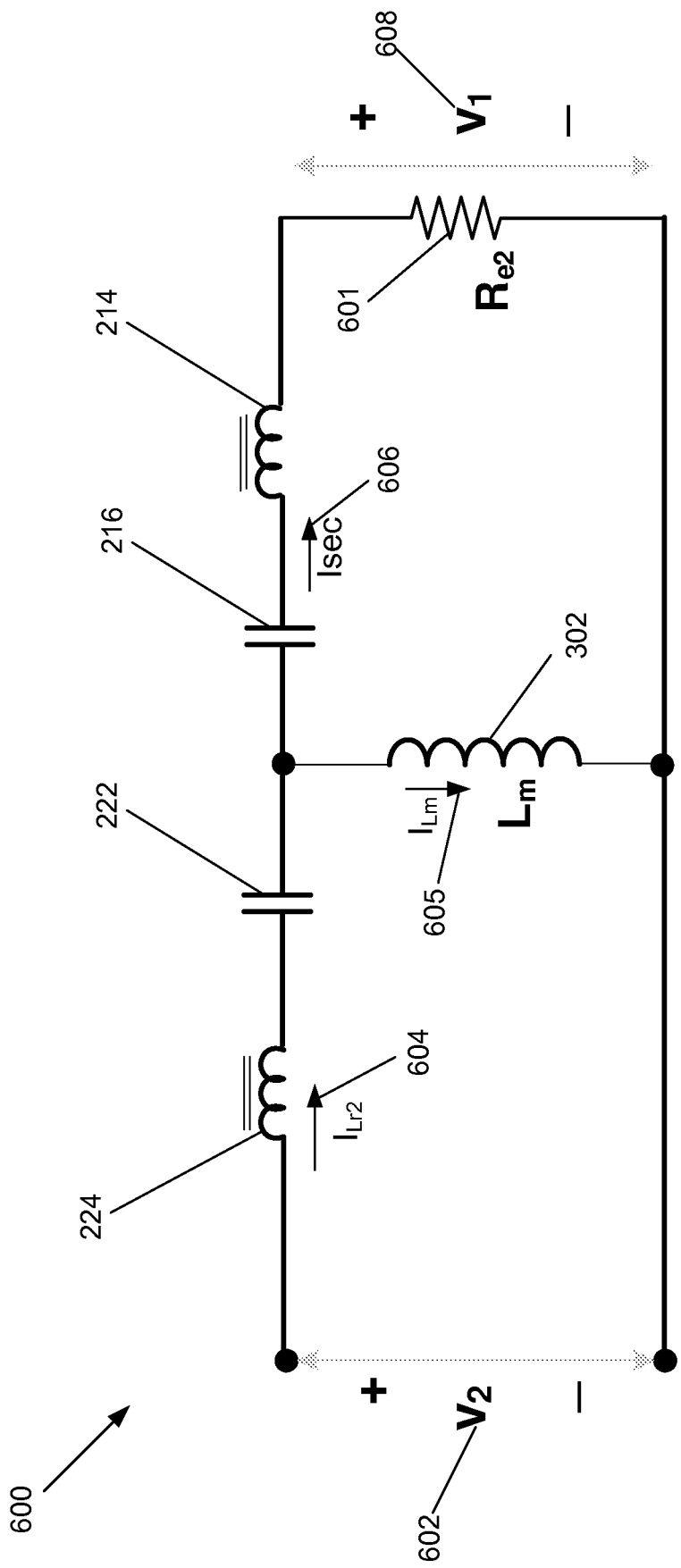
FIG. 6 is a circuit diagram of an equivalent resonant tank circuit of a bi-directional resonant DC-DC converter in a charger mode of operation according to aspects of the current invention.

FIG. 6 is a circuit diagram of an equivalent resonant tank circuit 600 of the converter 122 when the converter 122 is in the charger mode of operation (i.e., the relay circuit 220 is in the NO position) and the windings 217, 219 of the transformer 218 have a 1:1 turns ratio. The load resistance ($R_{e2}$) 601 represents an AC equivalent load resistor seen by the secondary side of the transformer 218 (i.e., coupled to the first winding 217 of the transformer 218). The load resistance ($R_{e2}$) 601 corresponds to a charging current of the battery 118. The magnetizing inductance ($L_m$) 302 is the inductance seen across the transformer 218. The first inductor 214, the second inductor 224, the second capacitor 216, and the third capacitor 222 are series resonant elements. In one embodiment, the second capacitor 216, first inductor, and magnetizing inductance ($L_m$) 302 are utilized in both the charger and discharger modes; however, in other embodiments, any number of elements may be used in both modes. In another embodiment, the second inductor 224 and/or the third capacitor 222 may be removed.

In the charger mode of operation, the converter 122 receives DC power from the DC bus 114 via the bus interfaces 236, 240. The second group of switches (S5-S6) 228a-228b is operated, by the controller 120, to convert the DC power received from the bus 114 into AC power (e.g., a square wave) having a desired voltage $V_2$ 606 and current ($I_{Lr2}$) 604. The AC power from the second group of switches (S5-S6) 228a-228b energizes the second winding 219 of the transformer 218 and as a result, a secondary current ($I_{sec}$) 606 is generated in the first winding 217. The secondary current ($I_{sec}$) 606 generates a voltage ($V_1$) 608 across the load resistance ($R_{e2}$) 601. The voltage ($V_1$) 606 is rectified by the body diodes 210a-210d of the first group of switches (S1-S4) 208a-208d and resulting rectified DC power is provided to the battery 118. According to one embodiment, the first group of switches (S1-S4) 208a-208d is operated in synch (i.e., turned on and off) with the second group of switches (S5-S6) to provide synchronous rectification and reduce losses in the body diodes 210a-210d of the first group of switches (S1-S4) 208a-208d.

The voltage gain ($V_1$ 608/$V_2$ 602) of the resonant tank 600 shown in FIG. 6 is a function of the operating frequency of the converter 122 (i.e., the switching frequency of the second group of switches (S5-S6) 228a-228b) determined by the controller 120.

Figure 7:
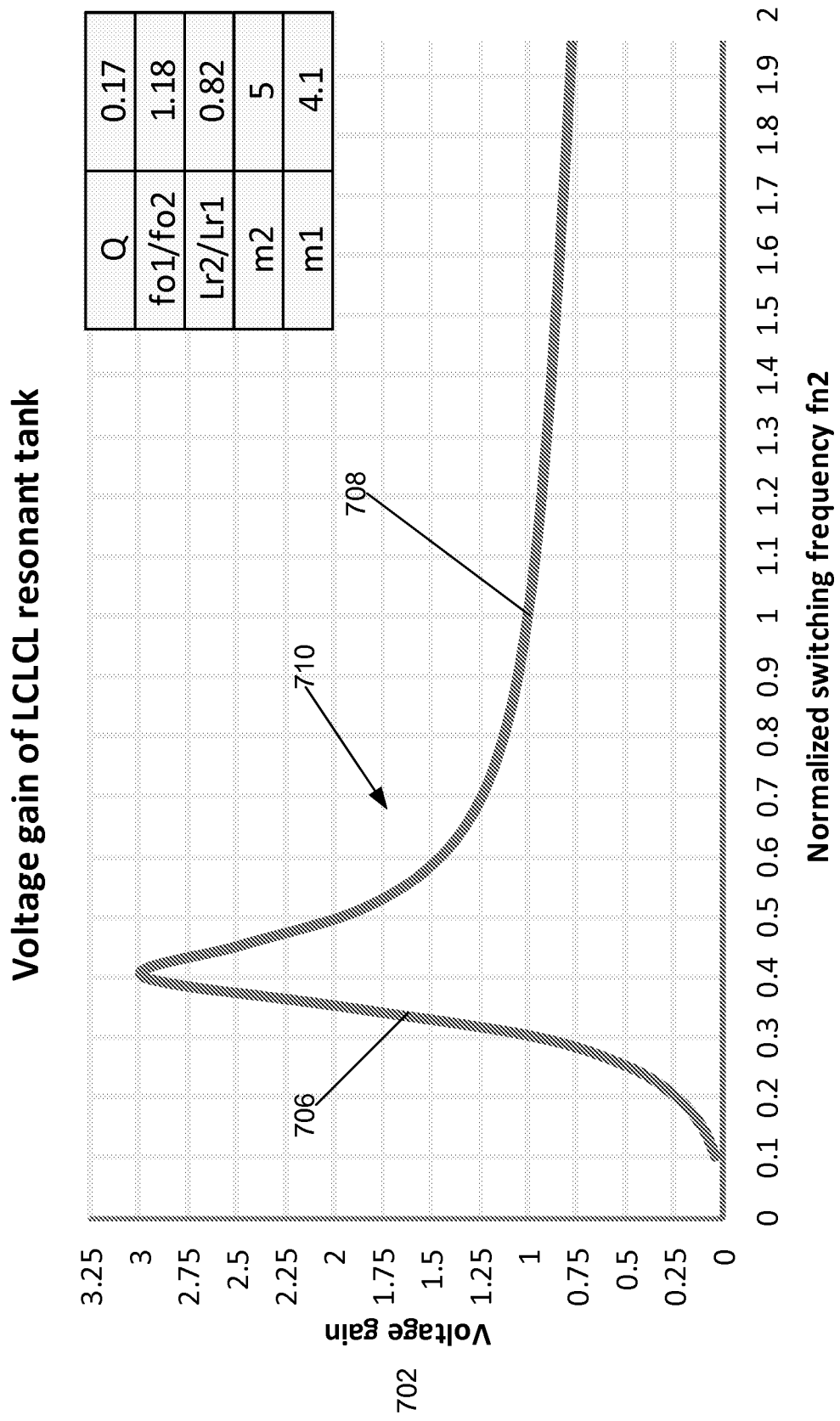
FIG. 7 is a graph illustrating voltage gain versus normalized switching frequency of a bi-directional resonant DC-DC converter in a charger mode of operation according to aspects of the current invention.

FIG. 7 is a graph 700 illustrating voltage gain ($V_1/V_2$) 402 versus normalized switching frequency ($f_{n2}$) 704 of the converter 122. The normalized switching frequency ($f_{n2}$) 704 is the switching frequency of the converter 122 divided by the series resonant frequency ($f_{o2}$) of the second inductor 224 and the third capacitor 222. The graph 700 shows a voltage gain curve 706 of the resonant tank 600 with a quality factor (Q) of 0.17, a variable $m_1$ of 4.1, a variable $m_2$ of 5, a variable $f_{o1}/f_{o2}$ of 1.18, and a ratio of the inductance of the second inductor 224 to the inductance of the first inductor 214 of 0.82, wherein:

$f_{o1}$ is the resonant frequency contributed by the first inductor 214 and the second capacitor 216;

$m_1$ is the ratio of the magnetizing inductance ($L_m$) 302 to the inductance of the first inductor 214; and $m_2$ is the ratio of the magnetizing inductance ($L_m$) 302 to the inductance of the second inductor 224.

The controller 120 monitors the voltage across the battery 118 and, based on the voltage across the battery 118, adjusts the switching frequency of the converter 122 to maintain the charging current of the battery 118 at a desired current reference level. Since the battery is directly connected across the battery interfaces 202, 204 of the converter 122, the voltage across the battery 118 may not be controlled instantly. Therefore, in one embodiment, the controller 120 sets the desired current reference level to its maximum value whenever the voltage across the battery 118 is less than its maximum value. The controller 120 maintains the current reference level at its maximum level until the voltage across the battery 118 reaches its maximum value. Once the voltage across the battery 118 reaches its maximum value, the controller 120 decreases the current reference level to zero.

As discussed above, the values of the first inductor 214, the second capacitor 216, and the magnetizing inductance ($L_m$) 302 may be selected based on the discharger mode of operation. The values of the second inductor 224 and the third capacitor 222 may be selected in such a way that, in the charger mode, when the voltage across the battery 118 is at a nominal level (i.e., less than its maximum level), the converter 122 is operated at the normalized frequency $f_{n2}$ 708 and the charger current to the battery 118 is at its maximum level. If the voltage across the battery 118 increases beyond the nominal value, the controller 120 increases the voltage gain of the converter 122 to hold the charging current of the battery 118 at its maximum level. The controller 120 increases the voltage gain of the converter 122 by reducing the switching frequency 710 of the converter 122. As the voltage across the battery 118 increases from its nominal value to its maximum value, the switching frequency of the converter 122 is decreased gradually to a minimum value by the controller 120. Once the voltage across the battery 118 reaches its maximum value, the switching frequency of the converter 122 is kept constant at its minimum value and the charger current to the battery 118 drops to around zero.

Similarly as discussed above with regard to FIG. 5 and the discharging mode of operation, in the charging mode of operation, the converter 122 may provide soft switching during turn-on of the second group of switches (S5-S6) 228a-228b. The current waveforms through branches of the resonant tank 600 would be substantially the same as the current waveforms shown in FIG. 5. For example, when the switch S5 228a is turned on (i.e., when $V_2$ 602 goes high) the input current ($I_{Lr2}$) 604 (i.e., the sum of the secondary current ($I_{sec}$) 606 and the magnetizing current ($I_{Lm}$) 605 is negative regardless of whether the converter 122 is operated at, below, or above resonance. The negative input current ($I_{Lr2}$) 604 flows through the body diode 229a of switch S5 228a just before it is turned on. Accordingly, the switch S5 228a turns on with zero voltage switching (ZVS) (i.e., soft switching) and incurs low turn-on switching loss. In addition, the secondary current ($I_{sec}$) 606 is zero at the instant of device turn on and therefore there is no reverse recovery loss for the body diodes 210a-210d of the switches S1-S4.

Also as discussed above with regard to FIG. 5 and the discharging mode of operation, in the charger mode of operation, the converter 122 may provide soft switching during turn-off of the second group of switches (S5-S6) 228a-228b. In one embodiment, the capacitor 231a-231b coupled across the drain and source of each switch 228a-228d is a snubber graded capacitor configured to provide soft switching at turn off. For example, just before the switch S5 228a is turned off, the capacitor 231a is charged up to the voltage level of the DC bus 114. Once the switch S5 228a is turned off, the voltage across the switch S5 228a increases; however, due to the capacitor 231a, the voltage across the switch S5 228a increases at a slower rate than it would if the capacitor 231a was removed. The capacitance of the capacitor 231a is selected such that the rise time for the voltage across the switch S5 228a is higher than the device turn-off switching time. As a result, the switch S5 228a turns off at a voltage less than the voltage level of the DC bus 114, resulting in reduced turn-off switching losses in the switch S5 228a. The turn-on and turn-off soft switching of the converter 122 in the charger mode of operation is described above with regard to switch S5 228a; however, similar turn-on and turn-off soft switching may be implemented in the charger mode of operation with switch S6 228b.

Figure 8:
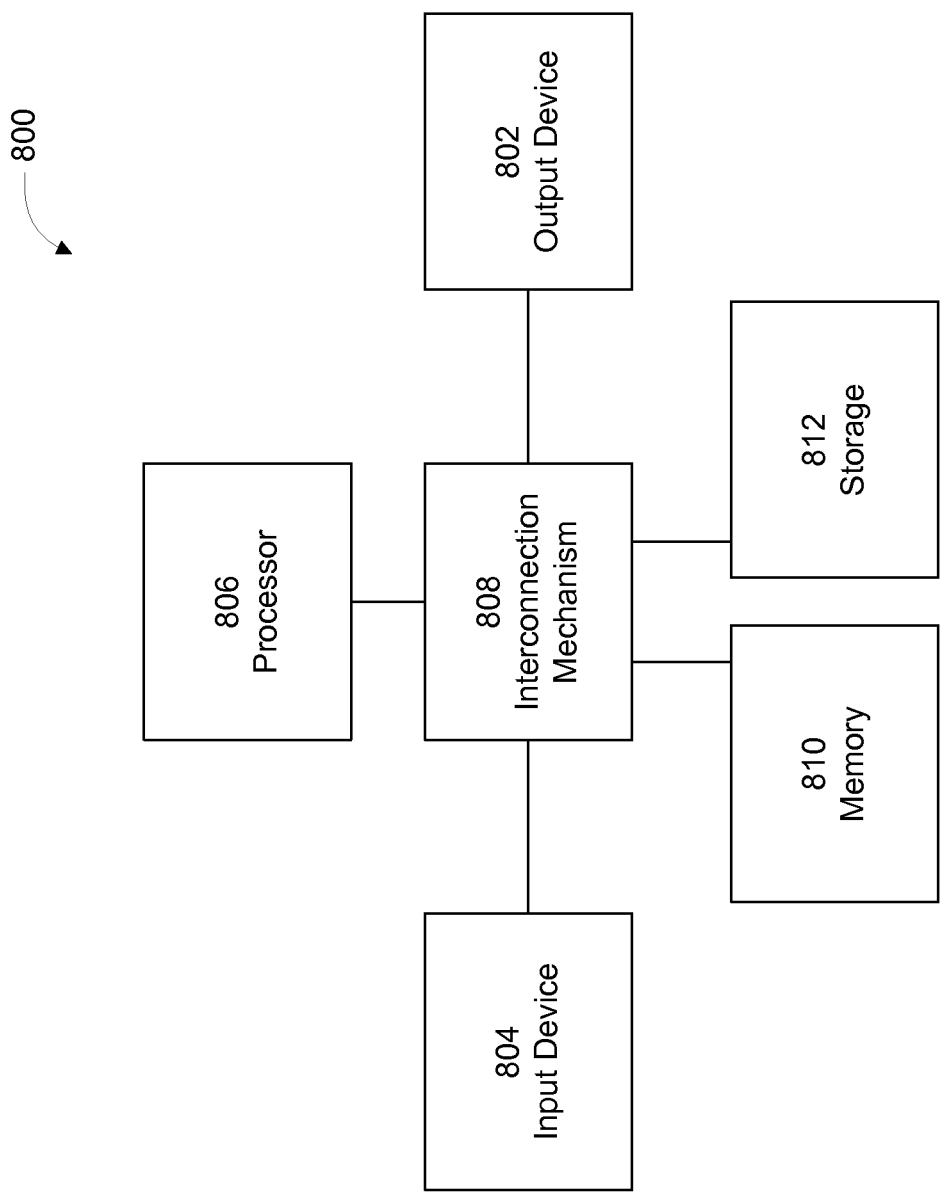
FIG. 8 is a block diagram of a system upon which various embodiments of the current invention may be implemented.

FIG. 8 illustrates an example block diagram of computing components forming a system 800 which may be configured to implement one or more aspects disclosed herein. For example, the system 800 may be communicatively coupled to a UPS or included within a UPS and configured to operate the UPS and a bidirectional DC-DC converter as discussed above.

The system 800 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 800 may include specially-programmed, special-purpose hardware, for example, an application-specific integrated circuit (ASIC). Various aspects of the present disclosure may be implemented as specialized software executing on the system 800 such as that shown in FIG. 8.

The system 800 may include a processor/ASIC 806 connected to one or more memory devices 810, such as a disk drive, memory, flash memory or other device for storing data. Memory 810 may be used for storing programs and data during operation of the system 800. Components of the computer system 800 may be coupled by an interconnection mechanism 808, which may include one or more buses (e.g., between components that are integrated within a same machine) and/or a network (e.g., between components that reside on separate machines). The interconnection mechanism 808 enables communications (e.g., data, instructions) to be exchanged between components of the system 800.

The system 800 also includes one or more input devices 804, which may include for example, a keyboard or a touch screen. The system 800 includes one or more output devices 802, which may include for example a display. In addition, the computer system 800 may contain one or more interfaces (not shown) that may connect the computer system 800 to a communication network, in addition or as an alternative to the interconnection mechanism 808.

The system 800 may include a storage system 812, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 810 that allows for faster access to the information by the processor/ASIC than does the medium. This memory 810 may be a volatile, random access memory such as a dynamic random access memory (DRAM) or static memory (SRAM). It may be located in storage system 812 or in memory system 810. The processor 806 may manipulate the data within the integrated circuit memory 810 and then copy the data to the storage 812 after processing is completed. A variety of mechanisms are known for managing data movement between storage 812 and the integrated circuit memory element 810, and the disclosure is not limited thereto. The disclosure is not limited to a particular memory system 810 or a storage system 812.

The system 800 may include a general-purpose computer platform that is programmable using a high-level computer programming language. The system 800 may be also implemented using specially programmed, special purpose hardware, e.g. an ASIC. The system 800 may include a processor 806, which may be a commercially available processor such as the well-known Pentium class processor available from the Intel Corporation. Many other processors are available. The processor 806 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, in the discharger mode of operation, the primary side of the converter 122 includes a full bridge converter; however, in other embodiments, the primary side of the converter 122 in the discharger mode of operation may include a half bridge converter, a push-pull converter, or some other appropriate type of converter. For example, according to one embodiment (e.g., as shown in the converter 1000 of FIG. 10), the primary side of the converter 1000 in the discharger mode of operation includes a half bridge converter (including switches S1 210a and S3 210c).

Figure 11:
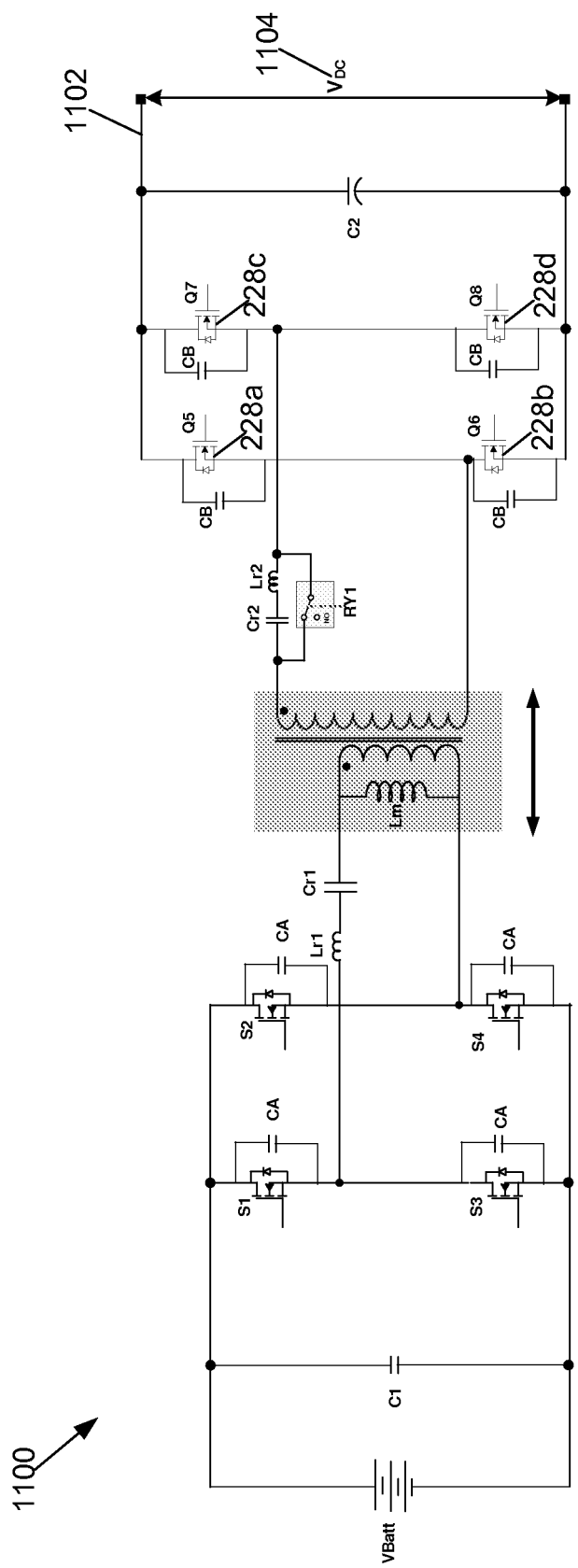
FIG. 11 is a circuit diagram of another embodiment of a bi-directional resonant DC-DC converter according to aspects of the current invention.

As also described above, in the charger mode of operation, the primary side of the converter 122 includes a half bridge converter; however, in other embodiments, the primary side of the converter 122 in the charger mode of operation may include a full bridge converter, a push-pull converter, or some other appropriate type of converter. For example, according to one embodiment (e.g., as shown in the converter 1100 of FIG. 11), the converter 1100 in the charger mode of operation includes a full bridge converter (including switches S5-S8 228a-d).

As described above, the converter 122 receives voltage from and provides voltage to multiple DC buses (e.g., a positive DC bus and a negative DC bus); however, in other embodiments, the converter 122 may be utilized with a single DC bus system. For example, according to one embodiment (e.g., as shown in the converter 1100 of FIG. 11), the converter 1100 is utilized to provide voltage ($V_{DC}$) 1104 to a single DC bus 1102.

As described above, the turns ratio of the transformer 218 is 1:1; however, in other embodiments, the transformer may be configured to have a different turns ratio.

As described above, the converter 122 is operated by a single controller 120; however, in other embodiments, the converter 122 may be operated by more than one controller. For example, in one embodiment, the converter 122 is operated by a discharger controller in the discharger mode of operation and by a charger controller in the charger mode of operation. In other embodiments, any number and/or type of controllers may be utilized to operate the converter 122.

As described above, the converter 122 is utilized in an online UPS 100; however, in other embodiments, the converter 122 may be utilized with any other type of UPS 100 (e.g., an offline or line-interactive UPS).

As described above, the converter 122 is utilized in a UPS 100; however, in other embodiments, the converter 122 may be utilized in any other types of power system (e.g., such as a High Voltage (HV) datacenter application) in which high power conversion efficiency is desired.

As described above, the UPS 100 receives input AC power from AC mains and DC power from a battery and provides AC power, derived from at least one of AC mains and DC battery power, to a load. However, in another embodiment, the UPS 100 may be configured to receive input DC power from a DC power source and provide AC power, derived from at least one of the input DC power and DC battery power, to a load. In another embodiment, the UPS 100 may be configured to receive input AC power from AC mains and provide DC power, derived from at least one of the input AC power and DC battery power, to a load.

Accordingly, at least some embodiments described herein provide a bi-directional resonant DC-DC converter that addresses issues related to the use of dual high-power converters. The single bi-directional resonant DC-DC converter is capable of operating as a high power discharger and a high power charger, leading to high converter utilization, high power density, and a lower cost power system. According to one embodiment, the bi-directional resonant DC-DC converter is also capable of utilizing soft switching during turn on and turn off periods of the converter. Soft switching allows the converter to operate at a high switching frequency, thereby reducing the size of the magnetic components of the converter. This may help in achieving high power density and a lower cost UPS. Soft switching may also result in low switching loss and a higher efficiency converter.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) comprising:
an input configured to be coupled to a power source and to receive input AC power;
a converter coupled to the input and configured to convert the input AC power into DC power;
a DC bus coupled to the converter;
an interface configured to be coupled to a battery and to receive DC battery power from the battery;
a bi-directional converter coupled to the interface and the DC bus, the bi-directional converter configured to provide DC charging power, derived from the input AC power, to the battery in a first mode of operation and to convert the DC battery power from the battery into backup DC power in a second mode of operation;
an output configured to be coupled to a load and to provide output power to the load derived from at least one of the input AC power and the backup DC power;

an inverter coupled to the DC bus and the output and configured, in the first mode of operation, to provide the output power derived from the DC power to the load via the output; and a controller coupled to the bi-directional converter and configured to operate the bi-directional converter at a first frequency in the first mode of operation to generate the DC charging power and to operate the bi-directional converter at a second frequency in the second mode of operation to generate the backup DC power, wherein the controller is further configured to:

monitor a first voltage level across the battery and, based on the first voltage level, adjust the first frequency to maintain a charging current level of the battery at a charging current reference level, and monitor a second voltage level across the battery and, based on the second voltage level, adjust the second frequency to maintain a backup DC voltage level of the backup DC power at a reference voltage.

2. The UPS of claim 1, wherein the bi-directional converter is configured, in the first mode of operation, to receive the DC power via the DC bus and convert the DC power into the DC charging power, and in the second mode of operation, to receive the DC battery power, convert the DC battery power into the backup DC power, and provide the backup DC power to the DC bus.

3. The UPS of claim 2, wherein a first gain applied by the bi-directional converter in the first mode of operation is a function of the first frequency and a second gain applied by the bi-directional converter in the second mode of operation is a function of the second frequency.

4. The UPS of claim 3, wherein the bi-directional converter is a resonant converter comprising:
   at least one battery interface configured to be coupled to the battery;
   a first converter bridge coupled to the at least one battery interface;
   a first resonant tank coupled to the first converter bridge;
   a first rectifier;
   a relay circuit configured to selectively couple the first resonant tank to the first rectifier in the second mode of operation; and
   at least one bus interface coupled between the first rectifier and the DC bus;
   wherein in the second mode of operation, the controller is configured to operate the first converter bridge at the second frequency to convert the DC battery power into first AC power, the first resonant tank is configured to apply the second gain to generate second AC power, and the first rectifier is configured to convert the second AC power into the backup DC power.

5. The UPS of claim 4, wherein the first converter bridge is configured to implement soft-switching during at least one of turn-on and turn-off periods of the first converter bridge.

6. The UPS of claim 4, wherein the bi-directional converter further comprises:
   a second converter bridge coupled to the at least one bus interface;
   a second resonant tank coupled to the second converter bridge and selectively coupled to the first resonant tank via the relay circuit; and
   a second rectifier coupled to the first resonant tank,
   wherein in the first mode of operation, the controller is configured to operate the second converter bridge at the first frequency to convert the DC power from the DC bus into third AC power, the first and second resonant tanks are configured to apply the first gain to generate fourth AC power, and the second rectifier is configured to convert the fourth AC power into the DC charging power.

7. The UPS of claim 6, wherein the second converter bridge is configured to implement soft-switching during at least one of turn-on and turn-off periods of the second converter bridge.

8. The UPS of claim 6, wherein the first resonant tank comprises:
   a first inductor coupled to the first converter bridge;
   a first capacitor coupled to the first inductor; and
   a transformer having a first winding coupled to the first capacitor and a second winding selectively coupled to the first rectifier via the relay circuit.

9. The UPS of claim 8, wherein the second resonant tank comprises:
   a second inductor coupled to the second converter bridge; and
   a second capacitor coupled to the second inductor;
   wherein the transformer having the second winding is selectively coupled to the second capacitor via the relay circuit;
   wherein the first inductor is coupled between the second rectifier and the first capacitor.

10. A method for operating a UPS, the UPS having an input, an interface configured to be coupled to a battery, and an output, the method comprising:
    monitoring input AC power provided to the input from a power source;
    converting, in a first mode of operation, the input AC power into DC power;
    operating, in the first mode of operation, a bi-directional converter at a first frequency to provide DC charging power, derived from the input AC power, to the battery;
    operating, in a second mode of operation, the bi-directional converter at a second frequency to convert DC battery power from the battery into backup DC power;
    converting, in the first mode of operation, the DC power into output AC power;
    providing, in the first mode of operation, the output AC power derived from the DC power to a load,
    monitoring, in the first mode of operation, a first voltage level across the battery and in response to monitoring the first voltage level across the battery, adjusting the first frequency of the bi-directional converter to maintain a charging current level of the battery at a desired charging current reference level; and
    monitoring, in the second mode of operation, a second voltage level across the battery and in response to monitoring the second voltage level across the battery, adjusting the second frequency of the bi-directional converter to maintain a backup DC voltage level of the backup DC power at a reference voltage level.

11. The method of claim 10, further comprising:
    applying, in the first mode of operation with the bi-directional converter, a first gain to generate the DC charging power having a charging current level, the first gain being a function of the first frequency of the bi-directional converter.

12. The method of claim 11, further comprising applying, in the second mode of operation with the bi-directional converter, a second gain to generate the backup DC power having a backup DC voltage level, the second gain being a function of the second frequency of the bi-directional converter.

13. The method of claim 12, further comprising:
determining that the voltage level across the battery is less than a maximum voltage level; and
in response to determining that the voltage level across the battery is less than the maximum voltage level, setting the first frequency of the bi-directional converter to maintain the charging current level at a maximum current reference level.

14. The method of claim 13, further comprising in response to determining that the voltage level across the battery is at the maximum voltage level, setting the first frequency of the bi-directional converter to maintain the charging current level at zero.

15. The method of 10, wherein operating the bi-directional converter in the first mode of operation at the first frequency includes implementing soft switching during at least one of turn-on and turn-off periods of the bi-directional converter.

16. The method of claim 10, wherein operating the bi-directional converter in the second mode of operation at the second frequency includes implementing soft switching during at least one of turn-on and turn-off periods of the bi-directional converter.

17. An Uninterruptible Power Supply (UPS) comprising:
an input configured to be coupled to a power source and to receive input AC power;
a converter coupled to the input and configured to convert the input AC power into DC power;
a DC bus coupled to the converter;
an interface configured to be coupled to a battery and to receive backup DC power from the battery;
an output configured to be coupled to a load and to provide output power to the load derived from at least one of the input AC power and the backup DC power;
an inverter coupled to the DC bus and the output and configured to provide the output power derived from the DC power to the load via the output; and
means for:
providing DC charging power from the DC bus to the battery by adjusting a first frequency to maintain a charging current level of the battery at a desired charging current reference level based on monitoring a first voltage level across the battery, and
providing the backup DC power from the battery to the DC bus by adjusting a second frequency to maintain a backup DC voltage level of the backup DC power at a reference voltage based on monitoring a second voltage level across the battery.

18. The UPS of claim 17, further comprising means for implementing soft switching during at least one of turn on and turn off periods of the means for providing DC charging power from the DC bus to the battery and providing the backup DC power from the battery to the DC bus.

19. The UPS of claim 1, wherein the inverter is further configured, in the second mode of operation, to provide the output power derived from the backup DC power to the load via the output.

20. The method of claim 10, further comprising:
converting, in the second mode of operation, the backup DC power into the output AC power; and
providing, in the second mode of operation, the output AC power derived from the backup DC power to the load.

* * * * *